(12) United States Patent
Kerschbaumer

(10) Patent No.: US 9,073,700 B2
(45) Date of Patent: Jul. 7, 2015

(54) CONVEYING DEVICE FOR HETEROGENEOUS, SENSITIVE FOODS THAT CANNOT BE PUMPED AND HAVE A LOW LIQUID CONTENT

(75) Inventor: Eric Kerschbaumer, Dreieich (FR)

(73) Assignee: Maschinenfabrik Leonhardt GmbH, Dreieich (DE)

( * ) Notice: Subject to any disclaimer, the term of this patent is extended or adjusted under 35 U.S.C. 154(b) by 31 days.

(21) Appl. No.: 14/128,148

(22) PCT Filed: Jul. 4, 2012

(86) PCT No.: PCT/EP2012/063057
§ 371 (c)(1),
(2), (4) Date: Dec. 20, 2013

(87) PCT Pub. No.: WO2013/004757
PCT Pub. Date: Jan. 10, 2013

(65) Prior Publication Data
US 2014/0124335 A1    May 8, 2014

(30) Foreign Application Priority Data

Jul. 6, 2011   (DE) .......................... 10 2011 051 599

(51) Int. Cl.
| B65G 33/26 | (2006.01) |
| B65G 33/14 | (2006.01) |
| B65G 33/08 | (2006.01) |
| B65G 33/34 | (2006.01) |
| A23L 1/16 | (2006.01) |
| A21C 15/00 | (2006.01) |

(52) U.S. Cl.
CPC ................ *B65G 33/14* (2013.01); *B65G 33/08* (2013.01); *B65G 33/265* (2013.01); *B65G 33/34* (2013.01); *A23L 1/16* (2013.01); *A21C 15/00* (2013.01)

(58) Field of Classification Search
CPC ...... B65G 33/265; B65G 33/08; B65G 33/12; B65G 33/26; B65G 33/34; B65G 33/14; A21C 15/00; A23L 1/16
USPC ......................................................... 198/676
See application file for complete search history.

(56) References Cited

U.S. PATENT DOCUMENTS

| 1,247,153 | A | * | 11/1917 | Roberts .......................... 366/104 |
| 2,585,124 | A | * | 2/1952 | Hill ................................ 209/516 |
| 4,091,693 | A | * | 5/1978 | Straub ............................ 76/102 |
| 5,092,453 | A | * | 3/1992 | Bruke ............................ 198/673 |

(Continued)

FOREIGN PATENT DOCUMENTS

| CN | 2078971 U | 6/1991 |
| DE | 1813219 A1 | 8/1969 |

(Continued)

OTHER PUBLICATIONS

International Search Report in corresponding application No. PCT/EP2012/063057 mailed Sep. 12, 2012.

*Primary Examiner* — Mark A Deuble
(74) *Attorney, Agent, or Firm* — Maier & Maier, PLLC

(57) ABSTRACT

For the conveying device for heterogeneous, sensitive foods that cannot be pumped and have a low liquid content, e.g., Asian noodle or rice dishes, a screw conveyor, which is designed as a hollow worm, is rotated by means of a drive motor. The drive motor is connected to the screw conveyor by a bearing flange and a connecting bolt. The screw conveyor is partially hollow and has radial spikes.

9 Claims, 2 Drawing Sheets

(56) References Cited

U.S. PATENT DOCUMENTS

| | | | |
|---|---|---|---|
| 5,529,170 A * | 6/1996 | Schwarz et al. | 198/676 |
| 6,843,922 B1 * | 1/2005 | Summers et al. | 210/683 |
| 7,222,725 B1 | 5/2007 | Somarakis | |
| 2011/0100930 A1 * | 5/2011 | DeWaard | 210/787 |
| 2012/0247927 A1 * | 10/2012 | Marchesini | 198/662 |

FOREIGN PATENT DOCUMENTS

| | | |
|---|---|---|
| DE | 3441425 C2 | 5/1990 |
| DE | 19520992 A1 | 12/1996 |
| DE | 10261058 A1 | 7/2004 |
| DE | 202004016295 UA | 1/2005 |
| DE | 2626196 A1 | 5/2007 |

* cited by examiner

CONVEYING DEVICE FOR HETEROGENEOUS, SENSITIVE FOODS THAT CANNOT BE PUMPED AND HAVE A LOW LIQUID CONTENT

BACKGROUND OF THE INVENTION

A. Field of the Invention

The invention relates to a conveying device for homogenous, sensitive and nonpumpable foodstuffs having a low liquid portion that are preferably ready-to-use foods. In particular, foods such as, but not exclusively, cooked or fried Asian noodle and rice dishes, vegetables salads, pasta salads, or baked goods covered with sauce are conveyed.

The importance of instant meals has risen and continues to rise significantly due to various social considerations, and this rising demand is also expressed in the also rising selection of instant meals. Global food trends are restructuring the food market and repeatedly confront the food industry with new problems. The requirements placed on food manufacturers and processors in terms of variety and quality are rising increasingly, and the end consumer is offered an increasing number of different instant meals that of course must be correspondingly prepared and packaged.

B. Related Art

It is known from DE 34 41 425 C2 that a screw conveyor can be used to transport foods. This screw conveyor is used according to the principle of the Archimedean screw to transport cut-up raw vegetables and cut-up raw lettuce using an angled screw conveyor. It is also known from the prior art that conveyor screws are also used especially to convey dried goods and to transport small-sized and flaked bulk goods in the field of commerce.

DE 18 13 219 A, which is known from the prior art, discloses a screw conveyor that is located in a cylindrical housing, and whose rotatable screw has an inner part which is independent from the screw and can be rotated at different angular speeds or is held in a freestanding manner in order, ideally, to convey powdered or doughy foods.

DE 195 20 992 A1 discloses a screw conveyor system which is used to remove waste from water. This prior art discloses three different areas of the employed screw conveyor, of which one area, that is, the one closest to the drive, is designed as a hollow screw. This design compensates for the sometimes strongly fluctuating supply of conveyed material.

DE 102 61 058 A1 describes a deicing agent distribution device for a winter road deicing vehicle where a screw conveyor conveys the deicing agent from a deicing agent reservoir to a down pipe opening. In order to declump the deicing agent, two rows of pins mounted strictly radially to the outside are fixed to the rotating screw.

A disadvantage of the devices known from the prior art is that the conveyed goods are not handled carefully enough to minimize waste.

Given the increasing trend toward instant meals such as Asian noodle or rice dishes, the processing food industry is continuously confronted with new challenges. The fine and frequently fragile structure of the employed ingredients which are used for such special instant meals needs to be fed completely to the packing machine, and the scrap arising from shearing forces needs to be minimized.

It is known from practice that loss from generated scrap is particularly high during transport from the storage container to fill the corresponding metering machine.

When foods are conveyed by a conveyor belt system or by a permanently installed screw conveyor from the storage container to the metering machine, at most the processing temperature has been considered in regards to the sensitivity of the food. The shearing forces that arise are usually not considered, which causes the sensitive goods to deform, and the food waste is correspondingly high.

SUMMARY OF THE DISCLOSURE

The problem therefore arises of transporting the sensitive foods to be transported as gently as possible with minimum pressure and shear force. This problem is solved with the device according to the invention, which, in contrast to the devices belonging to the prior art, has the decisive advantage of considering the fragility of the processed foods, and the foods to be packaged are handled gently due to the screw conveyor design and the geometry of the corresponding container outlet.

Figure 1:
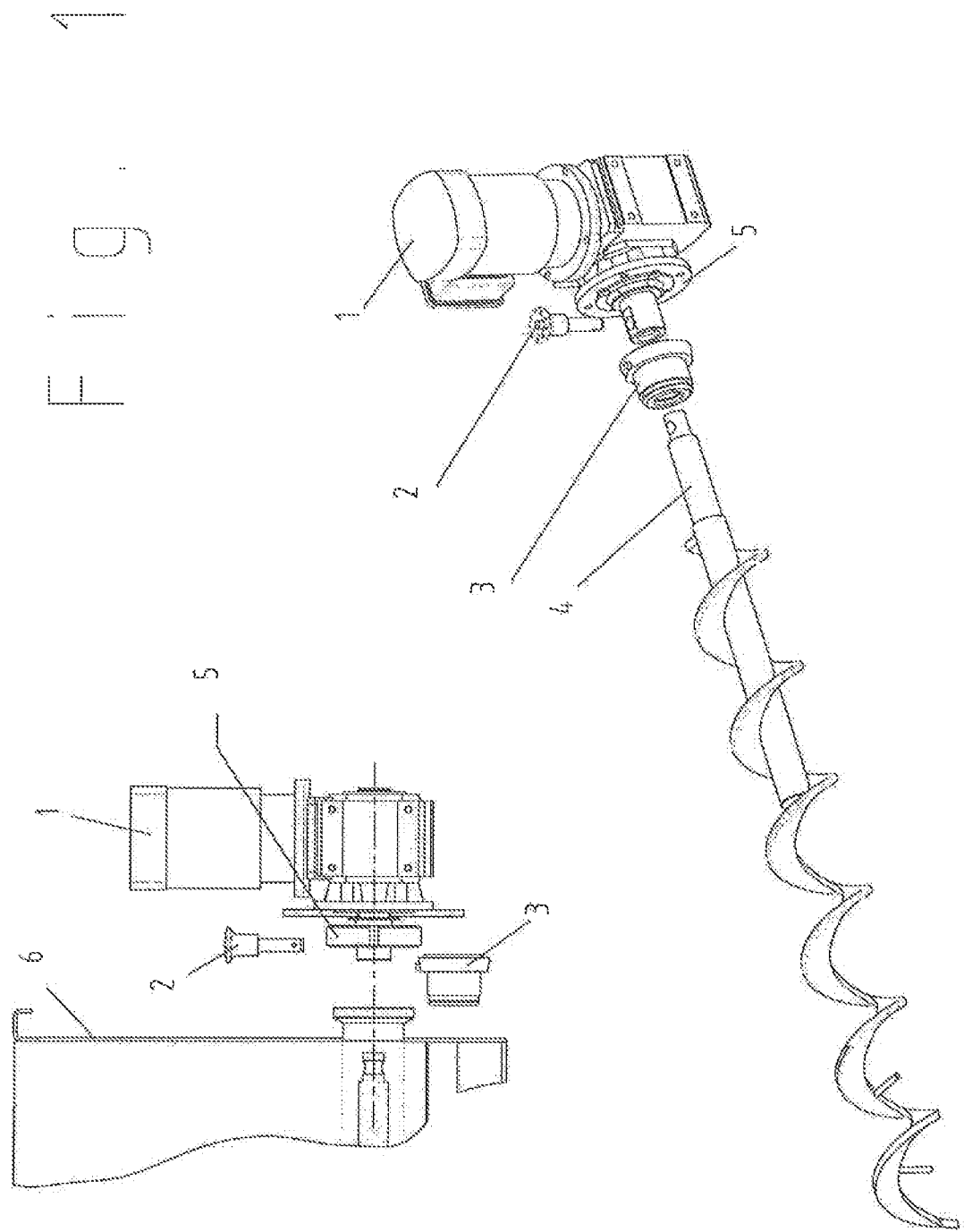
FIG. 1 shows the inventive device in exploded views.
Figure 2:
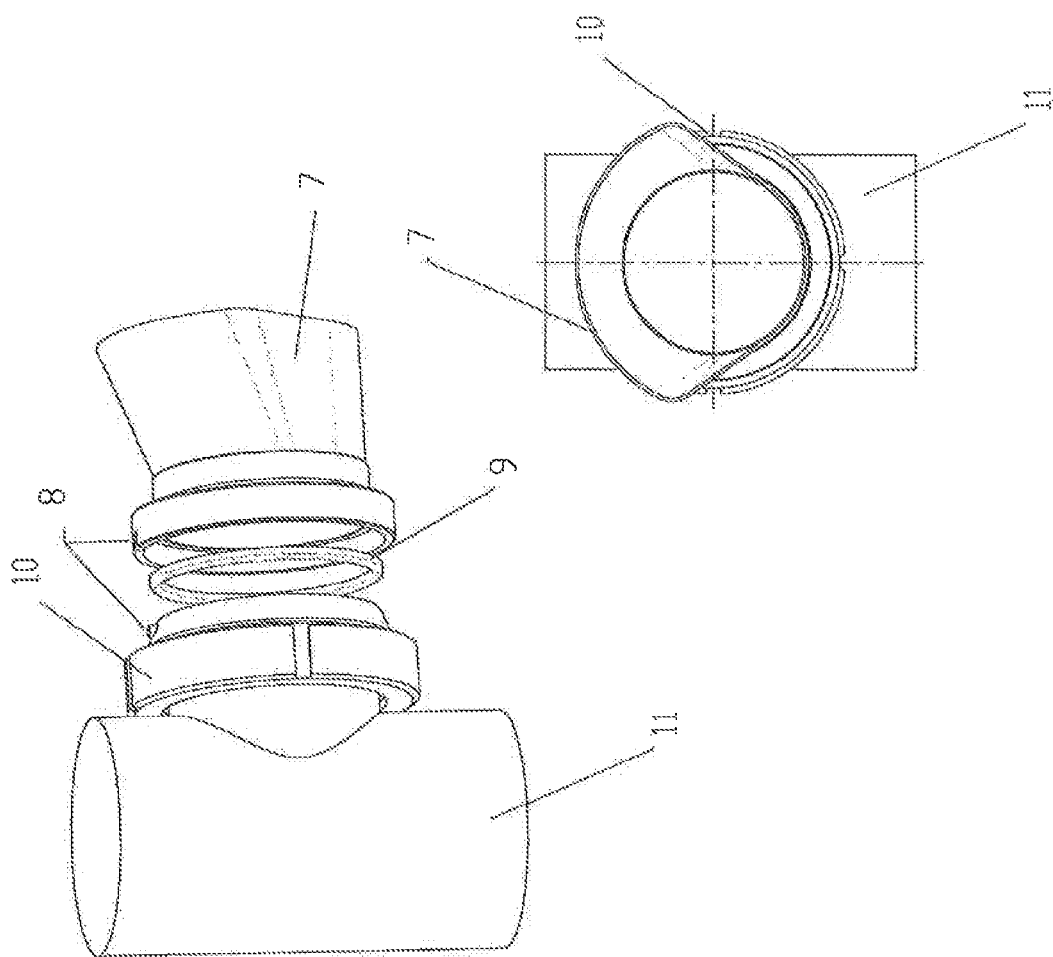
FIG. 2 shows a detail of the device in different views.

As can be seen in FIG. 1 and FIG. 2, the claimed device consists of a drive motor whose rotating shaft is connected by means of a connecting bolt 2 to the screw shaft 4. Due to the position of the drive motor 1, which is advantageously located outside of the screw trough, the shaft of the drive motor 1 and the screw shaft 4 are guided by a bearing flange 3 through the rear wall of the storage container 6. The screw conveyor itself is designed such that the part distant from the drive is designed as a hollow screw conveyor and possesses additional spikes that radially point toward the rotational midpoint of the screw conveyor 4. At the antegrade end, i.e., the end that points forward in the direction of movement, there is the connecting piece for the front wall 7 which has a special geometric shape and thereby minimizes the shearing force and pressure on the fragile and sensitive food. The connection between the connecting piece to the front wall 7 and the container outlet 11 is secured by an anti-rotation element 8 and a screw joint seal 9 so that the position of the connecting piece to the front wall 7 does not change under shear force and pressure and a tight connection exists between the individual components. In addition, all components consist of materials that are approved for food producing and processing companies and satisfy the corresponding requirements.

DETAILED DESCRIPTION OF PREFERRED EMBODIMENTS

The screw conveyor 4, which is preferably designed as a hollow screw in the device according to the invention, is driven by a drive motor 1, which is preferably located at the rear wall of the storage container 6. The drive motor 1 can be actuated in a variety of ways; ideally, it is controlled by means of a conventional programmable logic controller (PLC). This fully electronic programmable logic motor controller adapted to the application can of course ideally be adapted to the respective means of processing and, depending on the requirements, consistency and fragility of the food to be processed, apply a corresponding rotary speed and direction of rotation to the hollow screw conveyor 4.

The preferred embodiment of the motor location is to be chosen so that the motor housing does not come into contact with the media to be conveyed. It is known from practice that conveyance systems used to date are used in variance from the order even in shiftwork, and an operating temperature is set under a corresponding continuous load which does not correspond to the processing temperature of the food because of the preferred the design of the conveyance system as a three-phase AC motor.

According to claim 2, the drive motor 1 can be directly connected to the screw conveyor 4, or, in the case of a vertical embodiment, its rotational movement can be transferred to the screw conveyor 4 by means of e.g., a bevel gear. For the connection between the rotor shaft of the drive motor 1 and the screw shaft 4, a corresponding positive-fit connection is provided which is mounted in the device according to the invention as a bearing flange 3.

In comparison to the prior art, the present embodiment with a bearing flange 3 and a connecting bolt 2 has the advantage that the positive-fit connection is very easy to disconnect and remove without using a special tool. In this very sensitive environment, which has stringent industry-specific hygiene requirements, servicing and removing system parts without tools in addition has the significant advantage that the possibility of metal chip formation from the shearing movement of threads, etc. does not have to be taken into account. Due to the special embodiment of this positive-fit connection, the daily servicing and cleaning times are also significantly reduced, and expensive, long system downtimes are minimized.

With this embodiment, the step of disassembling while servicing and cleaning is reduced to a few simple manipulations, which therefore do not have to be performed by highly qualified professionals; instead, any trained employee can perform them with very little effort. Furthermore, this embodiment makes it possible to exchange individual components with very little effort and to quickly troubleshoot in the case of any errors. The simplicity and robustness of the embodiment of the device according to the invention plays a significant role in principle since, due to industry standards, small and very small parts are not used, and the designs of the individual parts are configured so that a missing component after servicing or cleaning would be obvious to the respective service or operating personnel. This embodiment therefore prevents small and very small parts from entering into the conveying, metering and packaging process and also from being processed, thereby precluding the food quality required by the end customer from being maintained. This cannot happen with the corresponding embodiments that exist with the present novel invention because small and very small part are not used, and machined parts therefore cannot also be processed.

The bearing flange 3 that guides the screw shaft 4 through the screw trough at the motor side should also be made of a material that satisfies conventional industry hygiene standards and be adapted to the employed screw shaft 4 in such a way as to yield a positive-fit connection between the components.

The screw conveyor 4 itself primarily functions to transport the respective medium and can be correspondingly designed depending on the requirements of the food to be transported. In this regard, the device according to the invention provides adapting the embodiment of the screw conveyor to the food so that it is adapted to the specified task and the food to be conveyed.

In addition to the task of conveying the food, the screw conveyor 4 prevents the conveyed medium from being compressed when sensitive, non-pumpable foods are used, and thus prevents the system parts from being subject to unnecessary shear force and pressure, or reducing the shear force as feasible. The constitution of the conveyed medium, which is influenced by the consistency and sensitivity of the respective ingredients, is also loosened up by the corresponding embodiment of the screw conveyor 4 and transported gently toward the container outlet 11. The screw conveyor 4 is preferably designed in this case as a partially hollow screw conveyor 4 which enables the respective food to be moved more gently in the axial direction of the screw conveyor 4 due to the absence of a shaft. This arrangement is reinforced by the radially arranged spikes which are also located on the screw conveyor 4 and are aligned in the direction of the rotational midpoint of the screw conveyor 4, and the special design of the partially hollow screw conveyor loosens up the food and relieves any arising shear force.

The container outlet 11 is designed in the device according to the invention with an additional connecting piece to the front wall 7, which is affixed to the container outlet 11 of antegrade end of the screw trough, and its special geometry reduces the shear force of the medium transported through the screw conveyor 4, and sensitive and fragile components of the transported media are not unnecessarily exposed to the shear forces that normally arise.

The embodiment of the connecting piece to the front wall 7 prevents, e.g., noodles, which are frequently part of modern instant meal production, from breaking on the container outlet edge or being deformed thereby and hence possibly being less acceptable to the end consumer.

The connecting piece to the front wall 7, which is attached to the container by means of a corresponding connecting nut 10, has the shape of a straight hollow cylinder on one side which constitutes the bottom part of the connecting piece, and a top part of the connecting piece can be described as a half, straight hollow cylindrical conical frustrum. The top part of the connecting piece is connected to the bottom part of the connecting piece such that an additional flat segment is incorporated between the interfaces of the lateral surface of the hollow conical frustrum and the half hollow cylinder that connects the straight half hollow cylinder and the angled lateral surface of the straight hollow conical frustrum to each other so that the shape of the connecting piece on the bottom side of the connecting piece yields a guide for the food to be transported and ideally supplies the food to the container due to the advantageous, funnel-shaped design of the top part. The food is supplied gently, and the transported goods conveyed and loosened up by the screw conveyor are transported with due consideration of their constitution toward the feed pipe, which, in terms of the technical process, is normally located after the container outlet 11.

The connecting piece to the front wall 7 itself is made of a material that is approved in the food industry and food processing businesses and is correspondingly long-lasting and robust in accordance with usage. Due to the constitution and the properties of the materials, the connecting piece can preferably be fabricated from stainless high-grade steel such as 1.4301/AISI 304.

Since the media-conducting system parts must be completely cleaned for reasons of hygiene and due to the different colors of the respective foods each time the food to be conveyed or packaged is changed, it is also the case with this connecting piece that the component must be absolutely easy and quick to install and remove.

In this preferred embodiment, the connecting piece is designed with an anti-rotation element 8 and a corresponding screw joint seal 9 against the container outlet 11, which, in addition, also ensures a required stability of the connecting piece.

REFERENCE NUMBER LIST

1) Drive motor
2) Connecting bolt

3) Bearing flange
4) Screw shaft (design: hollow shaft)
5) Screwed connection and preferably according to DIN 11850
6) Rear wall of the reservoir
7) Connecting piece to the front wall
8) Anti-rotation element
9) Screw joint seal
10) Connecting nut
11) Container outlet

The invention claimed is:

1. A device for conveying heterogeneous, sensitive and non-pumpable foodstuffs having a low liquid portion comprising:
   a drive motor,
   one screw conveyor which is configured as a hollow screw to cause, when rotated, a conveyance of foodstuffs in an axial direction of the screw conveyor by a coaxial helical feature,
   wherein the screw conveyor, at an end distance from a drive, is configured as a hollow screw and, at an antegrade end, has additional spikes that are aligned radially with respect to the rotational midpoint of the screw conveyor,
   a bearing flange, and
   a connecting piece to a front wall.

2. The device according to claim 1, wherein a rotating shaft of the drive motor is connected either directly or by of a corresponding positive-fit connection to a screw conveyor.

3. The device according to claim 1, wherein the device and a rotating shaft of the drive motor arranged therein, in conjunction with the screw conveyor, perform a conveying effect on a foodstuff located therein by a relative rotation of the shaft and conveyor with respect to the fixed housing.

4. The device according to claim 2, wherein the drive motor and the screw conveyor are connected to each other by a bearing flange connection, and the rotating shaft of the drive motor causes the screw conveyor to execute an even rotational movement.

5. The device according to claim 2, wherein a connection between the conveyor screw and rotating shaft of the drive motor is secured by a connecting bolt and is sealed with the assistance of a bearing flange.

6. The device according to claim 3, wherein an end of the housing distant from the drive is geometrically configured so a connecting piece that is at the antegrade end of the screw conveyor ensures that the food is handled gently.

7. The device according to claim 1, wherein all connecting pieces are arranged to ensure easy cleaning without additional special tools.

8. The device according to claim 1, wherein the device is made of materials which satisfy the applicable regulations for food.

9. The device according to claim 1, wherein all connecting pieces are arranged to ensure safe and smooth operation of the conveyance system.

* * * * *

UNITED STATES PATENT AND TRADEMARK OFFICE
CERTIFICATE OF CORRECTION

PATENT NO. : 9,073,700 B2  
APPLICATION NO. : 14/128148  
DATED : July 7, 2015  
INVENTOR(S) : Eric Kerschbaumer Page 1 of 1

It is certified that error appears in the above-identified patent and that said Letters Patent is hereby corrected as shown below:

Title page (Item (75) Inventor), after Dreieich, delete "(FR)", and insert --(DE)--.

Signed and Sealed this
First Day of December, 2015

Michelle K. Lee
*Director of the United States Patent and Trademark Office*